United States Patent
Sanchen

(10) Patent No.: US 7,445,065 B2
(45) Date of Patent: Nov. 4, 2008

(54) MOTOR VEHICLE WITH HYBRID DRIVE

(75) Inventor: Volker Sanchen, Stuttgart (DE)

(73) Assignee: Daimler AG, Stuttgart (DE)

(*) Notice: Subject to any disclaimer, the term of this patent is extended or adjusted under 35 U.S.C. 154(b) by 567 days.

(21) Appl. No.: 10/518,486

(22) PCT Filed: Apr. 30, 2003

(86) PCT No.: PCT/EP03/04482

§ 371 (c)(1),
(2), (4) Date: Jul. 12, 2005

(87) PCT Pub. No.: WO04/000597

PCT Pub. Date: Dec. 31, 2003

(65) Prior Publication Data

US 2005/0284675 A1    Dec. 29, 2005

(30) Foreign Application Priority Data

Jun. 20, 2002    (DE) ................................ 102 27 530

(51) Int. Cl.
*B60K 6/22* (2007.10)

(52) U.S. Cl. .............. 180/65.2; 180/65.3; 903/941; 903/942; 903/943; 903/944

(58) Field of Classification Search ............... 180/65.1, 180/65.2, 65.3; 903/926, 941, 942, 943, 903/944
See application file for complete search history.

(56) References Cited

U.S. PATENT DOCUMENTS

| | | | | |
|---|---|---|---|---|
| 3,850,695 A | * | 11/1974 | Keller et al. ................ | 429/23 |
| 5,366,821 A | * | 11/1994 | Merritt et al. ................ | 429/21 |
| 5,631,532 A | * | 5/1997 | Azuma et al. ............... | 320/102 |
| 5,905,360 A | * | 5/1999 | Ukita .......................... | 320/118 |
| 6,276,473 B1 | | 8/2001 | Zur Megede | |
| 6,615,940 B2 | * | 9/2003 | Morisawa ................... | 180/65.1 |
| 6,672,415 B1 | * | 1/2004 | Tabata ........................ | 180/65.2 |
| 6,777,909 B1 | * | 8/2004 | Aberle et al. ................ | 320/104 |
| 6,835,481 B2 | * | 12/2004 | Dickman et al. ............. | 429/19 |
| 7,059,436 B2 | * | 6/2006 | Iwasaki ....................... | 180/65.3 |
| 7,237,634 B2 | * | 7/2007 | Severinsky et al. .......... | 180/65.2 |

FOREIGN PATENT DOCUMENTS

| | | |
|---|---|---|
| DE | 195 23 109 C2 | 6/1995 |
| DE | 199 13 794 A1 | 3/1999 |
| DE | 199 13 794 A 1 | 3/1999 |
| EP | 1 055 545 A2 | 11/2000 |
| EP | 1 203 697 A2 | 5/2002 |
| EP | 1 286 405 A1 | 2/2003 |
| WO | WO 98/40922 | 9/1998 |

OTHER PUBLICATIONS

German Search Report, filed Jun. 20, 2002.
International Search Report, filed Apr. 30, 2003.

* cited by examiner

*Primary Examiner*—Christopher P Ellis
*Assistant Examiner*—John Daniel Walters
(74) *Attorney, Agent, or Firm*—Crowell & Moring LLP

(57) ABSTRACT

Motor vehicle having a hybrid drive and a fuel cell system. When activated, the fuel cell system can be operated continuously in a predetermined operating range or at a predetermined operating point of high efficiency, whereby any excess energy generated can be supplied to a power consuming device to maintain the high power withdrawal from the fuel cell system required for said high efficiency.

11 Claims, 1 Drawing Sheet

MOTOR VEHICLE WITH HYBRID DRIVE

This application claims the priority of German application no. 10227530.0, filed Jun. 20, 2002, and PCT International Patent Application No. PCT/EP03/04482, filed Apr. 30, 2003, the disclosure of which is expressly incorporated by reference herein.

BACKGROUND AND SUMMARY OF THE INVENTION

This invention relates to a motor vehicle with an internal combustion engine and a fuel cell.

Specifically, this invention relates to a motor vehicle comprising a hybrid drive device with an internal combustion engine and with at least one electric machine, at least one electric energy storage mechanism and one fuel cell system for supplying electricity.

Furthermore, this invention relates to a method for operating such a motor vehicle.

A motor vehicle and a method of this type are known from German Patent DE 199 13 794 A1 (Corresponding to U.S. Pat. No. 6,276,473). The known motor vehicle has an internal combustion engine which can drive the motor vehicle immediately after starting the vehicle electric system and an electric motor as the main drive motor which receives its power from a fuel cell system. The motor vehicle is driven by the electric motor instead of the internal combustion engine as soon as the fuel cell system has reached operating temperature due to heating of the exhaust gas of the internal combustion engine. After the fuel cell system has reached the operating temperature, the motor vehicle can be driven by the electric motor and/or by the internal combustion engine. From the power generated by the fuel cell system, secondary units of the motor vehicle and units of the fuel cell system can be supplied with the electric power which is needed to operate the at least one fuel cell of the fuel cell system.

WO 98/40922 describes a motor vehicle having a hybrid power generating system comprising a fuel cell system and an internal combustion engine. Hydrocarbon fuel is first cleaved in a pyrolysis reactor to form a fuel component containing hydrogen and the remaining fuel. The at least one fuel cell of the fuel cell system is operated with the hydrogen-containing fraction, supplying electric power for the electric motor. The remaining fuel may be used as fuel for the internal combustion engine. The fuel cell system is designed to supply approx. 50% of the max. power to be supplied by the hybrid vehicle. In a low-load range, the fuel cell system supplies all or most of the required power. At a higher load, the internal combustion engine is also operated. The internal combustion engine can be used directly for driving the vehicle wheels or for driving an electric generator which generates power for a single electric motor.

This invention is intended to achieve the object of reducing the power consumption of a motor vehicle by using a fuel cell system. This object is achieved according to this invention by a motor vehicle having an internal combustion engine, at least one electric machine, at least one electric energy storage mechanism; and a fuel cell system for generating electric power, and by a method for operating the same.

Accordingly, this object is achieved by the fact that the fuel cell system is designed as an auxiliary power source for delivering a lower power than the internal combustion engine; a control device is provided so that in its activated state, the fuel cell system can be operated continuously in a predetermined operating range or at a predetermined operating point of high efficiency, whereby the power it can deliver can be supplied to at least one power consuming device, and any excess power generated by the fuel cell system can be supplied to at least one additional power consuming device to obtain the high power delivery by the fuel cell system as required to achieve the high efficiency mentioned above. Therefore, the fuel cell system forms an auxiliary power unit.

Other objects, advantages and novel features of the present invention will become apparent from the following detailed description of the invention when considered in conjunction with the accompanying drawings.

DETAILED DESCRIPTION

Figure 1:
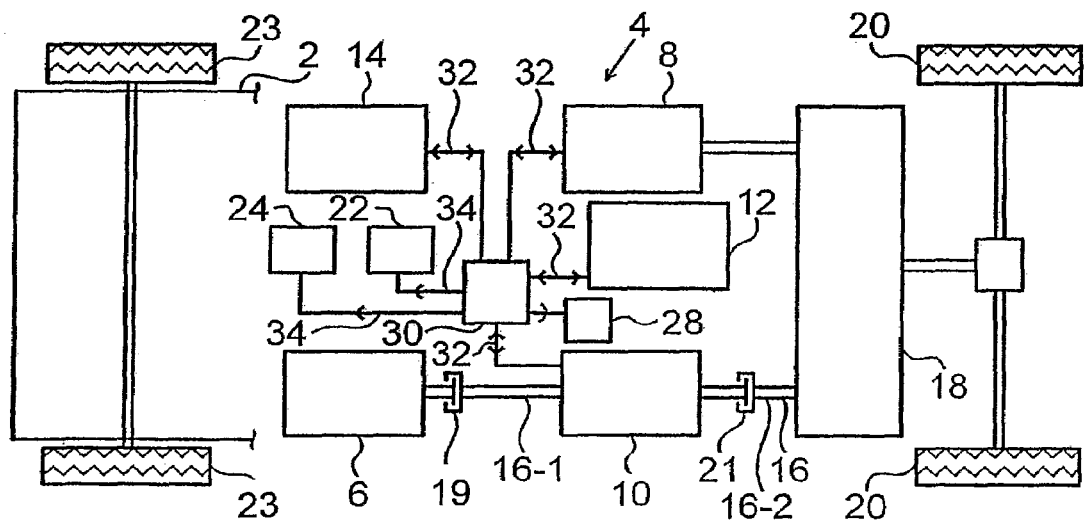
FIG. 1 shows a motor vehicle according to an embodiment of the present invention having a parallel hybrid drive.

The motor vehicle 2 depicted in FIG. 1 contains a parallel hybrid drive device 4 having an internal combustion engine 6 and at least one electric machine 8 and/or 10. Furthermore, at least one energy storage mechanism 12 is provided for storing electric power, and a fuel cell system 14 is provided for generating electric power and preferably also for generating usable thermal energy. The energy storage mechanism 12 may be a battery, for example, or a capacitor.

The internal combustion engine 6 is connected via a drive train 16 to an automotive transmission 18 and can drive the vehicle wheels 20 via this transmission. Additional vehicle wheels 23 may be driven in the same way or may be non-driven wheels.

The second electric machine 10 is in the drive train 16. When operated as an electric motor, it can drive the vehicle wheels 20 in addition to or instead of the wheels being driven by the internal combustion engine via the automotive transmission 18. Preferably a first shiftable clutch 19 and/or a second shiftable clutch 21 is provided in at least one of the two line sections 16-1 and/or 16-2 between the second electric machine 10 and the internal combustion engine 6 and/or this second electric machine 10 and the automotive transmission 18. When the first clutch 19 is disengaged and the second clutch 21 is engaged at the same time, the second electric machine 10 (a) may function as an electric motor to transmit electric power from the energy storage mechanism 12 and/or the fuel cell system and to transmit driving torque to the vehicle wheels 20 without entraining the internal combustion engine 6, or (b) may function as an electric generator which is driven by the vehicle wheels 20 to generate electric current which is stored in the energy storage mechanism 12 and/or can be transmitted to auxiliary units 22 and/or 24, or (c) may be operated as an electromagnetic vehicle brake. When the second clutch 21 is disengaged and the first clutch 19 is engaged at the same time, the second electric machine 10 may be (a) driven by the internal combustion engine 6 and thereby generate electric power by functioning as a generator, said electric power being storable in the energy storage mechanism 12 and/or able to be supplied to the secondary units 22 and 24, or (b) used as a starter for starting the internal combustion engine 6.

As an electric motor, the first electric machine 8 can obtain electric power from the energy storage mechanism 12 and/or from the fuel cell system 14 and transmit torque via the automotive transmission 18 to the vehicle wheels 20, either alone or together with the second electric machine 10, which is operated as an electric motor, and/or together with the internal combustion engine 6. Furthermore, the first electric machine 8 can be driven by the vehicle wheels 20 and can thereby generate electric current which can be stored in the energy storage mechanism 12 and/or can be supplied to the secondary units 22, 24 and/or auxiliary units of the fuel cell system 14 that are necessary for operation of its at least one fuel cell, e.g., compressor, heating or air conditioning system, fan, valves.

The electric current is distributed among the various elements by an electronic control unit 30 of a vehicle electric system 28. After turning on the electric vehicle electric system and thus also the control unit 30, the motor vehicle 2 can be started immediately with the internal combustion engine 6. The resulting heat generated by the internal combustion engine, e.g., by its exhaust, can be used to heat the fuel cell system 14 to operating temperature. Instead of or in addition to that, a heating device may also be provided for heating the fuel cell system 14. After the fuel cell system 14 has reached operating temperature, its electric power may be used exclusively or additionally to provide mechanical energy to the internal combustion engine 6 to drive the motor vehicle 2.

Double arrows 32 and single arrows 34 indicate on the electric connecting paths between the individual parts in the drawings show the direction of electric current flow. The double arrows 32 show that the current can flow in either one direction or the other depending on whether the respective parts are supplying or are being supplied with electric power.

According to this invention, the fuel cell system 14 is designed as an auxiliary power source for delivering a lower power than the internal combustion engine 6 and through the control unit 30, when the vehicle electric system is turned on, the fuel cell system 14 can be operated continuously in a predetermined operating range or at a predetermined operating point of high efficiency, in which case the power that can be delivered by the fuel cell system can be supplied to at least one preselected unit of the following power consuming devices: electric machine 8, 10, power storage device 12 and/or secondary units 22, 24, vehicle electric system 28 and control unit 30 and any excess power generated by the fuel cell system 14 can be supplied to at least one additional unit of these power consuming units, depending on predetermined operating criteria such as the charge status of the electric energy storage mechanism 12 and the instantaneous power demand of the other power consuming units.

According to a preferred embodiment of this invention, the fuel cell system 14 is designed only for the maximum power demand of the vehicle electric system 28 and at least one of the secondary units 22, 24. The secondary units 22, 24 not only deliver automotive driving power but also serve other functions such as the operation of the air conditioning system, interior heating, seat heating, cigarette lighter, radio, television, navigation system, data processing system, ice chest or refrigerator, window opener, door opener, sunroof or convertible top opener, trunk opener, vehicle steering, vehicle brake system, vehicle interior lighting, vehicle exterior lighting, telecommunication systems, compressor, oil pump, water pump and/or gasoline pump and/or a tool unit, in particular a cable winch, vehicle lift and/or a street sweeper brush.

According to a preferred embodiment of this invention, the maximum efficiency of the fuel cell system 14 is in the predetermined operating range or at the predetermined operating point.

Figure 2:
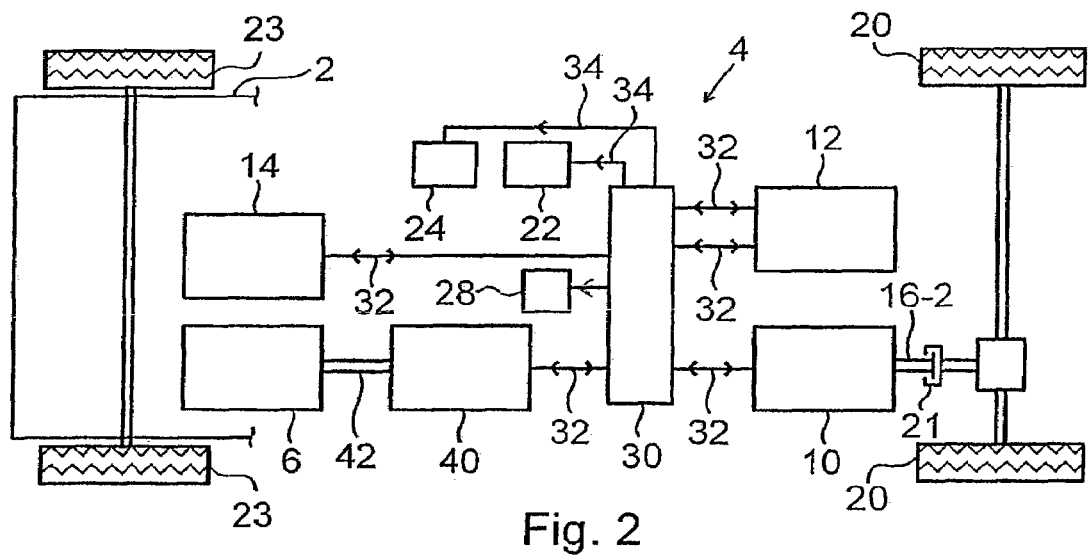
FIG. 2 shows schematically another embodiment of a motor vehicle according to this invention with a serial hybrid drive.

Similar parts in FIG. 2 are labeled with the same reference notation as that used in FIG. 1. A generator 40 has or can have a drive connection to an internal combustion engine 6 through a drive connection 42 for generation of electric power and it is or can be electrically connected via an electric or electronic control unit 30 of the vehicle electric system 28 to the electric energy storage mechanism 12 and/or an electric machine 10. The electric machine 10 is or can be connected electrically to the generator 40 or to the electric energy storage mechanism 12 (e.g., a battery or a capacitor) either directly or preferably via the control unit 30. The electric machine 10 has a drive connection to the vehicle wheels 20 via a drive train section 16-2 or it can be connected thereto via a shiftable clutch 21. The drive train section 16-2 may contain a transmission.

The generator 40 is preferably also operable as an electric motor for starting the internal combustion engine 6.

When the electric machine 10 is supplied with electric current from the energy storage mechanism 12 or the generator 40, it acts as an electric drive motor for driving the vehicle. Furthermore, this electric machine 10, when it is driven by the vehicle wheels 20 when the vehicle is coasting, can function as a generator and thereby supply current to the energy storage mechanism 12. Furthermore, there is also the possibility of supplying electric power to the electric machine 10, as an electric vehicle brake.

A fuel cell system 14 is connected or connectable to the electric energy storage mechanism 12 either directly or preferably via the electric control unit 30. For starting the fuel cell system 14, it obtains electric current from the energy storage mechanism 12. After the fuel cell system 14 has reached operating status, e.g., it has reached the operating temperature required for internal reactions, it is itself capable of generating power, which can then be supplied to the energy storage mechanism 12. Furthermore, an electric connection of the fuel cell system to the electric side of the electric machine 10 and/or to the electric side of the generator 40 may also be provided, preferably via the control unit 30, to supply the fuel cell system 14 with electric power to start it or to supply the electric machine 10 with electric power from the fuel cell system 14.

As in FIG. 1, the internal combustion engine 6 in FIG. 2 is again the main power generator for the drive of the vehicle. The fuel cell system 14 is designed as an auxiliary power source for delivering a lower power than the internal combustion engine 6. Through the control unit 30, the fuel cell system 14 is operated continuously in a predetermined operating range or at a predetermined operating point of high efficiency whenever the fuel cell system is turned on; the power deliverable by the fuel cell system can be supplied to one or more predetermined devices of the power consuming devices, any excess power generated by the fuel cell system 14 being supplied to at least one other unit of these power consuming devices, depending on the power demand of the device, in order to maintain the high power delivery by the fuel cell system 14 required for good efficiency.

The excess energy generated by the fuel cell system 14 is preferably used to drive the vehicle or is stored in the energy storage mechanism 12. The maximum efficiency of the fuel cell system 14 is preferably in the predetermined operating range or at the predetermined operating point. Secondary units 22 and/or 24 may also be provided in FIG. 2, as in FIG. 1.

The excess power of the fuel cell system 14 in FIG. 2, like that in FIG. 1, may be supplied either completely or partially to the energy storage mechanism 12 or to the electric machine 10 when the latter is operated as an electric driving motor, depending on the operating criteria. Such operating criteria include, for example, the charge capacity of the energy storage mechanism 12 and its instantaneous charge status and the instantaneous power demand of the electric machine 10. It can be seen from this that the electric power of the fuel cell system 14 can be supplied only to the energy storage mechanism 12 or, according to another embodiment, it may also be supplied simultaneously or alternatively to the electric machine 10.

According to a preferred embodiment, the fuel cell system 14 is designed (with respect to its maximum deliverable power) only for the maximum power demand of the vehicle electric system and/or at least one of the secondary units or all the secondary units 22, 24 which are not provided for delivering driving power.

The fuel cell system 14 thus functions only as an auxiliary power unit while the internal combustion engine 6 is the main source of driving energy. The fuel cell system 14 is at peak efficiency when a consumer that withdraws from the fuel cell system its maximum generable power is connected to the fuel cell system.

In FIG. 1 and FIG. 2, the fuel cell system 14 is designed to permit a standing supply (shutdown of the vehicle and/or shutdown of the internal combustion engine 6). The fuel cell system 14 generates enough current when the vehicle is shut down, in particular when the internal combustion engine is shut down, in operation of the most important secondary units 22 and/or 24 to maintain at least the minimum charge status of the energy storage mechanism 12 and/or for a renewed starting of the fuel cell system 14 and to start the internal combustion engine 6.

Figure 3:
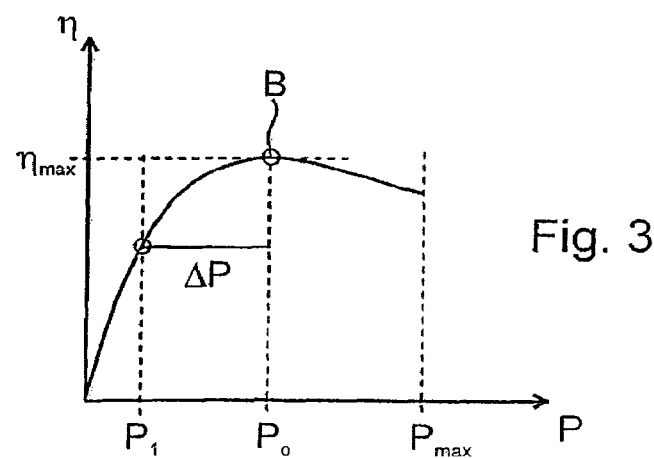
FIG. 3 shows a diagram which illustrates the functional relationship between efficiency and power delivered by a fuel cell system in accordance with an embodiment of the present invention.

This invention is explained in greater detail below with reference to FIG. 3. It shows the efficiency $\eta$ of the fuel cell system 14 as a function of the power "P" generated by it for all the embodiments of this invention.

The fuel cell system 14 has its best, i.e., maximum, efficiency $\eta_{max}$ at a system-determined optimum energy delivery level. This requires an optimum power demand $P_0$ of the at least one power consuming device connected to the fuel cell system 14. This yields an optimum operating point "B." The fuel cell system 14 is designed for the maximum power demand $P_{max}$ of the vehicle electric system and the secondary units 22, 24. According to this invention, at both optimum power demand $P_0$ and at a reduced power demand $P_1$, the fuel cell system 14 is operating at the optimum operating point "B" at which the maximum efficiency $\eta_{max}$ prevails or it is operating in an operating range that is close to the optimum operating point "B" or is close to or includes that point. This is achieved by the fact that at a reduced power demand $P_1$, the excess power $\Delta P$ generated (difference between the reduced power demand $P_1$ and the optimum power demand $P_0$ at the maximum efficiency $\eta_{max}$) is delivered to the at least one electric machine 8 and 10 for driving operation or to the energy storage mechanism 12. The optimum energy, i.e., power $P_0$ at which the maximum efficiency $\eta_{max}$ prevails based on the system amounts to 2.5 kW, for example, for a passenger vehicle. Depending on the type of vehicle, the value may be between 1.5 kW and 5.0 kW, for example. At an optimum power (optimum power demand) $P_0$ of 2.5 kW and a reduced power demand $P_1$ of 0.6 kW, this yields an excess power of 1.9 kW, which can be used directly for driving operation or can be stored temporarily in the energy storage mechanism 12.

This prevents the fuel cell system 14 from being operated in an operating range of low efficiency. If the optimum operating point "B" cannot be situated in the range of the maximum efficiency $\eta_{max}$, it is preferably shifted in the direction of the maximum power demand $P_{max}$ rather than in the direction of the reduced power demand $P_1$ because the efficiency curve, starting from the maximum efficiency $\eta_{max}$, drops much more steeply toward the bottom than toward the top.

The fuel cell system 14 is designed only for a power great enough to ensure a basic supply for minimum operation of the motor vehicle, e.g., for starting the internal combustion engine and for starting the fuel cell system and the lighting system needed for operation of the vehicle. Preferably, however, the basic power supply of the fuel cell system 14 is also used to supply power for vehicle devices such as the air conditioning system and/or secondary units as mentioned above.

This invention yields the following advantages, for example, high energy savings, high total efficiency of the motor vehicle due to fuel cell power supply and recuperation of electric power by operation of one or more electric machines as a generator which can be driven by the vehicle when coasting and/or by the internal combustion engine; power supply when the vehicle is standing still, in particular when the internal combustion engine is turned off, which is particularly low noise, effective and environmentally friendly; relieving the burden on the energy storage mechanism 12 so that the latter has a greater lifetime; purely electric drive of the vehicle on a permanent basis is also possible as long as only low power levels are required; all the known advantages of a hybrid drive are preserved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Motor vehicle, with a hybrid drive device having an internal combustion engine, at least one electric machine at least one electric energy storage mechanism; a fuel cell system for generating electric power, wherein the fuel cell system is an auxiliary power source for delivering a lower power than the internal combustion engine; a control unit controls the operation of the fuel cell system to operate continuously in a predetermined operating range or at a predetermined operating point of a high efficiency, with the power the fuel cell system delivers being supplied at least to one power consuming device and any excess power of the fuel cell system being supplied to at least one additional power consuming device as required to maintain high fuel cell system efficiency.

2. Motor vehicle as claimed in claim 1, wherein the excess power of the fuel cell system is supplied at least partially into the at least one energy storage mechanism so that the latter functions as the additional power consuming device.

3. Motor vehicle as claimed in claim 1, wherein the excess power can be at least partially supplied to the at least one electric machine as driving power, so that the electric machine serves as the additional power consuming device.

4. Motor vehicle as claimed in claim 1, wherein at least some of the excess power of the fuel cell system can be supplied at least partially to the at least one electric machine and the at least one energy storage mechanism as a function of at least one operating criterion so that at least one of these devices serve as the additional power consuming devices.

5. Motor vehicle as claimed in claim 4, wherein the at least one operating criteria include a drive power demand of the motor vehicle, charge status and maximum charge capacity of the at least one electric energy storage mechanism.

6. Motor vehicle according to claim 1, wherein the fuel cell system maximum deliverable power is approximately equal to the maximum power demand of the vehicle electric system and of at least one secondary unit which does not deliver any driving power.

7. Motor vehicle as claimed in claim 6, wherein the at least one secondary unit an air conditioning system, interior heating, seat heating, cigarette lighter, radio, television, navigation system, data processing system, ice chest, refrigerator, window opener, door opener, sunroof opener, convertible top opener, trunk opener, vehicle steering, vehicle brake system, vehicle interior lighting, vehicle exterior lighting, telecommunications system, compressor, oil pump, water pump, gasoline pump, tool unit, a cable winch, vehicle lift or street sweeper brush.

8. Motor vehicle as claimed in claim 1, wherein the predetermined operating range or operating point is at or near the maximum efficiency of the fuel cell system.

9. Method for operating a motor vehicle with a hybrid drive device having an internal combustion engine, at least one electric machine, a fuel cell system for generating electric power which delivers a lower power than the internal combustion engine, and at least one electric power storage mechanism, comprising the steps of
    activating the fuel cell system;
    operating the fuel cell system continuously in an operating range or at an operating point of high efficiency;
    supplying at least a portion of the power generated by the fuel cell system to at least one power consuming device;
    supplying any excess power generated by the fuel cell system to at least one other power consuming device in order to maintain a power demand on the fuel cell system corresponding to high efficiency operating range or operating point.

10. Method as claimed in claim 9, wherein the excess power of the fuel cell system is stored at least partially in one of the at least one energy storage mechanisms.

11. Method as claimed in claim 9, wherein the predetermined operating range or operating point is at or near the maximum efficiency of the fuel cell system.

* * * * *